United States Patent [19]

Sumrell

[11] 4,008,669
[45] Feb. 22, 1977

[54] RESILIENTLY BIASED TIE-DOWN ANCHOR

[76] Inventor: Robert Earl Sumrell, 2069 State Road W., Warren, Ohio 44481

[22] Filed: Nov. 28, 1975

[21] Appl. No.: 635,847

[52] U.S. Cl. ............................ 105/484; 62/239; 98/6; 105/422; 105/477; 248/499; 280/179 A; 296/40

[51] Int. Cl.² ...................... B60P 7/04; B60P 7/12; B61D 17/10; B61D 45/00

[58] Field of Search ............ 62/239; 98/6; 105/367, 105/422, 463, 464, 465, 466, 469, 473, 477, 483, 484; 248/307, 339, 340, 489, 509; 280/179 R, 179 A, 179 B; 296/28 R, 40

[56] References Cited

UNITED STATES PATENTS

| | | | |
|---|---|---|---|
| 1,280,210 | 10/1918 | Golding | 280/179 A |
| 1,867,352 | 7/1932 | Churgay et al. | 280/179 A |
| 2,532,743 | 12/1950 | Storch | 105/422 X |
| 2,756,693 | 7/1956 | Frost | 105/484 X |
| 2,873,694 | 2/1959 | Jaskouilak | 280/179 R X |
| 3,007,422 | 11/1961 | Brotton | 105/484 |
| 3,102,708 | 9/1963 | Crain | 105/484 |
| 3,201,077 | 8/1965 | Heimann | 248/307 X |
| 3,322,385 | 5/1967 | Larrabee | 248/307 X |
| 3,508,764 | 4/1970 | Dobson et al. | 280/179 R |
| 3,638,895 | 2/1972 | Henson | 105/367 |

*Primary Examiner*—L. J. Paperner
*Assistant Examiner*—Howard Beltran
*Attorney, Agent, or Firm*—Donnelly, Maky, Renner & Otto

[57] ABSTRACT

A cargo tie-down anchoring apparatus for a refrigerated van and the like comprising series of resiliently biased eye bolts disposed in grooves along opposite sides of the floor of the van, which eye bolts extend through the floor and transverse floor supporting flanged beams, said eye bolts, when not in use, being in retracted position in the respective floor grooves so as not to interfere with loading and unloading of the van with the usual perishable cargo and when in use, being elevated above the floor level and engaged by hooks at the ends of flexible strap assemblies having buckle means for tightening the strap assemblies over heavy cargo such as steel coils.

15 Claims, 4 Drawing Figures

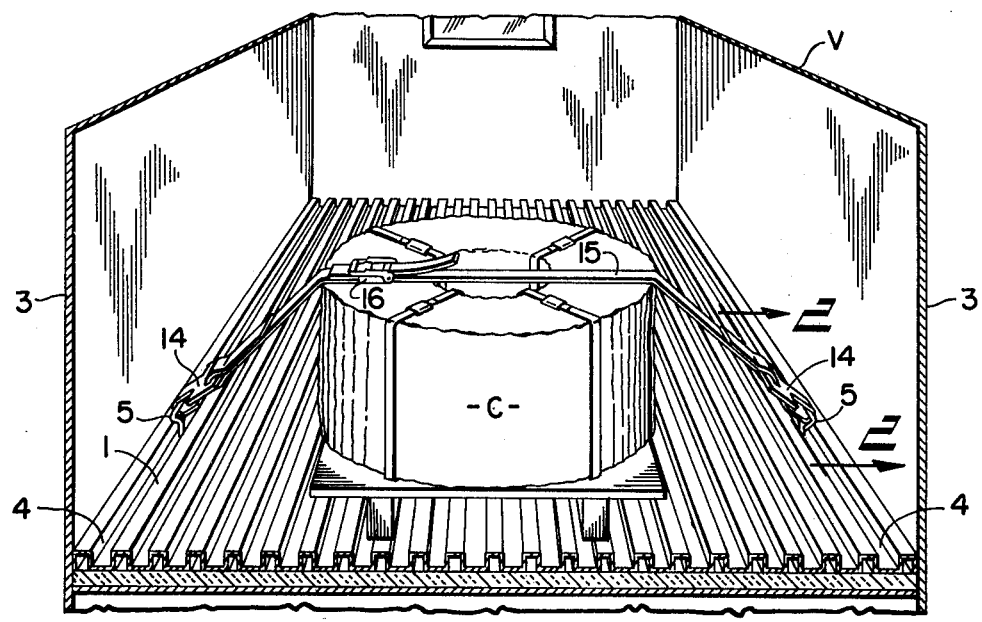
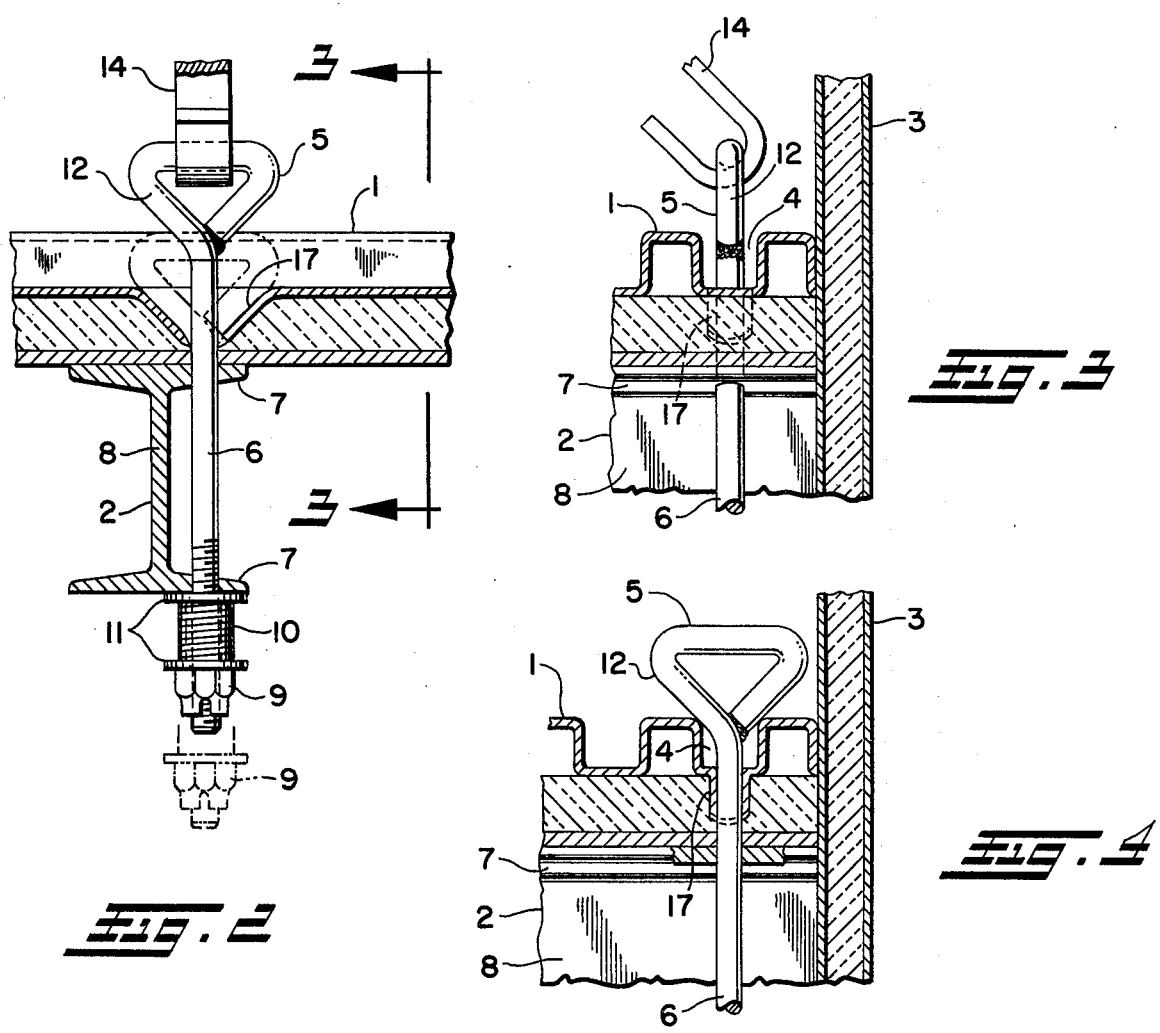

RESILIENTLY BIASED TIE-DOWN ANCHOR

BACKGROUND OF THE INVENTION

Refrigerated vans are generally employed for hauling perishable cargo in crates or boxes without need for cargo tie-down equipment.

On the other hand, cargo such as steel coils are hauled on flatbed trailers and are firmly secured in place as by chains extending over the coils and having their ends secured to suitable anchors along opposite sides of the trailer platform. Although plastic wrappings on the coils may serve as protection from the elements, condensation of moisture on the coils and thermal expansion and contraction thereof are problems to be contended with due to variations in temperature during hauling from the usual 65° F temperature at the mill or warehouse and at the delivery warehouse.

SUMMARY OF THE INVENTION

It is a principal object of this invention to provide a cargo tie-down apparatus which at low cost extends the usefulness of a refrigerated van and the like to haul cargo other than perishable foods without interfering with the normal intended use of the van while making provision for securely anchoring in place heavy cargo such as steel coils and the like. Such cargo when hauled in a refrigerated van is protected from ambient conditions and is maintained at a substantially constant temperature such as 65° F which is approximately the same temperature as in the steel mill or warehouse and in the delivery warehouse whereby steel cargo is not subjected to varying temperatures and condensation nor is there expansion or contraction of the cargo.

Other objects and advantages will appear from the ensuing description.

BRIEF DESCRIPTION OF THE DRAWING

FIG. 1 is a rear perspective view of a refrigerated van showing a steel coil on its pallet securely anchored in place by flexible strap means having hooks at opposite ends hooked to eye bolts disposed near opposite sides of the van floor;

FIG. 2 is a cross section view on enlarged scale taken substantially along the line 2—2, FIG. 1;

FIG. 3 is a cross section view taken substantially along the line 3—3, FIG. 2; and FIG. 4 is a view similar to FIG. 3 except showing an eye bolt turned to a position where it is held with its eye above the floor of the van to facilitate engagement by a hook of the flexible strap assembly.

DETAILED DESCRIPTION OF A PREFERRED EMBODIMENT

FIG. 1 is a rear perspective view of the interior of a refrigerated van V having a longitudinally corrugated or grooved floor 1 which is insulated as shown and is supported by transverse I-beams 2 at regular intervals between the insulated side walls 3 of the van.

The floor grooves 4 adjacent the side walls 3 have eye bolts 5 secured thereto preferably in spaced apart relation corresponding to the location of spacing of the I-beams 2. The shank 6 of each eye bolt 5 is disposed vertically in a snugly fitting hole drilled through the floor 1 and through the flanges 7 adjacent one side of the web 8 of the associated I-beam 2 so as not to weaken said I-beam 2. The lower end of said shank 6 has a lock nut 9 screwed thereonto with a coil spring 10 of square cross-section wire and washers 11 disposed between the lock nut 9 and the bottom flange 7. When the cargo tie-down apparatus is not in use, the spring 10 is operative to retain the eye bolt 5 in a retracted position as shown in phantom lines in FIG. 2 whereat the flat top of the eye 12 is substantially flush with the top of the floor 1 so that the series of eye bolts 5 along opposite sides of the floor 1 do not in any way interfere with loading and unloading of perishable cargo into and from the van.

When cargo such as steel coils C are to be transported, they are secured in place in the van V by engaging the flat hooks 14 at the opposite ends of flexible strap assemblies 15 in the eyes 12. To facilitate engagement of the hooks 14 with the eyes 12, the eye bolts 5 may be raised against the pressure of the springs 10 and turned 90° as shown in FIG. 4 whereby the eye bolts 5 will be retained in elevated position for easy engagement of the strap hooks 14 therewith followed by turning of the eye bolts 5 to the FIG. 2 position whereupon, when the buckle 16 is tightened the cargo C will be firmly tied down against the floor 1 of the van V. It is to be understood that the cargo C may be positioned with its middle located halfway between two successive eye bolts 5 on each side whereby two strap assemblies 15 may be employed extending diagonally from each eye bolt 5 to a diagonally opposite eye bolt 5 whereby the strap assemblies cross each other and thus assist in more securely fastening the cargo against longitudinal shifting on the floor 1. The eye bolts 5, of course, are capable of rotary self-adjustment so as to keep the hooks 14 in straight pull engagement with the eyes 12.

When cargo C such as shown in FIG. 1 reaches its destination, the buckle 16 is loosened and the hooks 14 are disengaged from the eye bolts 5 whereupon the springs 10 will assist in pulling the eye bolts 5 down to their inoperative position whereat they are substantially flush with or slightly below the top of the floor 1.

To impart great strength to the eyes 12, they are welded closed as shown. To permit retraction of each eye bolt 5 as shown in phantom lines in FIG. 2, the bottom of the floor groove 4 is deformed as at 17 to receive the lower portion of the eye 12.

As evident from the foregoing description, steel and like cargo may be maintained at desired temperature during transit to avoid problems from condensation and expansion and contraction. Preferably, the transit temperature will be about 65° F which is generally the same as steel mill or warehouse temperature and delivery warehouse temperature. Moreover, the strap assemblies 15 being of flexible material such as woven polyester there will be no damage to the upper edges of the coil C at the location of the straps. Although the cargo herein shown is wrapped in plastic it is not necessary to do so.

It has been found that the present tie-down apparatus is capable of tying down heavy steel coils so firmly that, even in the event of turning of the van V on its side, there is no shifting of the coil C. Furthermore, there is no longitudinal or lateral shifting of the cargo C due to sharp turning or abrupt braking of the van nor is there any vertical movement of the cargo C during travel of the van over rough roads.

The embodiments of the invention in which an exclusive property or privilege is claimed are defined as follows:

1. A cargo tie-down apparatus for a refrigerated van and the like having a longitudinally grooved floor supported by transverse flanged beams therebeneath, said apparatus comprising a flexible strap assembly positioned over cargo on said floor and having downwardly extending end portions secured to anchoring means on said floor; at least one of said anchoring means comprising an eye bolt having an eye at its upper end and having a shank extending downwardly through a hole in a floor groove and through the flanges of one of said beams; and eye bolt retaining means to permit limited vertical movement of said eye bolt from a lowered position in said floor groove to an elevated position whereat one end portion of said strap assembly is engaged with said eye.

2. The apparatus of claim 1 wherein said retaining means includes a spring biasing said eye bolt to said lowered position.

3. The apparatus of claim 1 wherein said retaining means comprises a coil spring around said shank between one of said flanges and a lateral enlargement on said shank operative to bias said eye bolt to said lowered position, said coil spring being compressed solid between said flange and shank enlargement in the elevated position of said eye bolt.

4. The apparatus of claim 3 wherein said enlargement comprises a lock nut screwed onto the lower end portion of said shank.

5. The apparatus of claim 1 wherein said one end portion comprises a hook detachably engaged with said eye.

6. The apparatus of claim 5 wherein said hook is a flat hook and wherein said eye has a horizontal straight upper portion engaged with said hook.

7. The apparatus of claim 1 wherein said eye bolt is rotatable in said hole to position said eye in a vertical plane which is perpendicular to a vertical plane passing through said strap assembly.

8. The apparatus of claim 1 wherein said floor groove has a recess to receive the lower portion of said eye in the lowered position of said eye bolt.

9. A cargo tie-down apparatus for a vehicle having a floor supported by transverse flanged beams therebeneath comprising an eye bolt having an eye at its upper end and having a shank extending downwardly through a hole in said floor and through the flanges of one of said beams; and eye bolt retaining means to permit limited vertical movement of said eye bolt from a retracted position in said floor to an elevated position whereat the eye of said eye bolt is above the floor for engagement with the end portion of a flexible strap assembly adapted to be tightened over cargo on said floor.

10. The apparatus of claim 9 wherein spring means biases said eye bolt to such retracted position.

11. The apparatus of claim 9 wherein said eye bolt is rotatable in said hole to position said eye in a vertical plane which is perpendicular to a vertical plane passing through said strap assembly.

12. The apparatus of claim 9 wherein said floor has a recess to receive said eye in said retracted position.

13. The apparatus of claim 9 wherein said retaining means comprises a lock nut screwed onto the lower end portion of said shank, and spring means between said lock nut and beam to bias said eye bolt to said retracted position.

14. The apparatus of claim 13 wherein said spring means comprises a coil spring which is compressed solid in said elevated position.

15. The apparatus of claim 14 wherein said coil spring is made from rectangular cross-section wire to prevent buckling of said spring when compressed solid as aforesaid.

\* \* \* \* \*